US012537294B2

(12) United States Patent
Chigira et al.

(10) Patent No.: US 12,537,294 B2
(45) Date of Patent: Jan. 27, 2026

(54) ANTENNA CONTROL DEVICE, ANTENNA CONTROL METHOD, AND PROGRAM

(71) Applicant: NTT, Inc., Tokyo (JP)

(72) Inventors: Hiroshi Chigira, Tokyo (JP); Masakatsu Aoki, Tokyo (JP); Takashi Miyatake, Tokyo (JP)

(73) Assignee: NTT, Inc., Tokyo (JP)

(*) Notice: Subject to any disclaimer, the term of this patent is extended or adjusted under 35 U.S.C. 154(b) by 0 days.

(21) Appl. No.: 18/715,162

(22) PCT Filed: Dec. 3, 2021

(86) PCT No.: PCT/JP2021/044552
§ 371 (c)(1),
(2) Date: May 31, 2024

(87) PCT Pub. No.: WO2023/100370
PCT Pub. Date: Jun. 8, 2023

(65) Prior Publication Data
US 2025/0038404 A1 Jan. 30, 2025

(51) Int. Cl.
*H01Q 3/04* (2006.01)

(52) U.S. Cl.
CPC .................................... *H01Q 3/04* (2013.01)

(58) Field of Classification Search
CPC .................................. H01Q 3/02; H01Q 3/04
See application file for complete search history.

(56) References Cited

U.S. PATENT DOCUMENTS

| | | | | |
|---|---|---|---|---|
| 2004/0053581 A1* | 3/2004 | Iwami | H04B 7/0848 | 455/101 |
| 2006/0132374 A1* | 6/2006 | Wang | H01Q 21/005 | 343/770 |
| 2017/0194706 A1* | 7/2017 | Lee | H04B 7/0619 | |

FOREIGN PATENT DOCUMENTS

JP 2019009744 A 1/2019

* cited by examiner

*Primary Examiner* — Daniel Munoz

(57) ABSTRACT

An antenna control device (10) according to the present invention includes: a mobile environment characteristic measurement unit (11) that measures a displacement amount in a three-dimensional direction of a first communication device (1) on which a first antenna (3) is mounted; a storage unit (14) that stores antenna characteristics of the first antenna (3); and a determination unit (12) that determines whether or not a gain of the first antenna (3) is equal to or greater than a threshold when the first communication device (1) communicates with a second communication device (2), and in a case where the gain of the first antenna (3) is less than the threshold value, receives as input the antenna characteristics of the first antenna (3) and the displacement amount in the three-dimensional direction of the first communication device (1) to determine orientations of the first antenna (3) and a second antenna (4) that is mounted on the second communication device (2) so that the gain of the first antenna (1) is equal to or greater than the threshold; and a first antenna orientation change unit (13) that receives a determination result from the determination unit (12) and changes the orientation of the first antenna (3).

16 Claims, 6 Drawing Sheets

ANTENNA CONTROL DEVICE, ANTENNA CONTROL METHOD, AND PROGRAM

CROSS-REFERENCE TO RELATED APPLICATIONS

This application is a U.S. 371 Application of International Patent Application No. PCT/JP2021/044552, filed on 3 Dec. 2021, the disclosure of which is hereby incorporated herein by reference in its entirety.

TECHNICAL FIELD

The present disclosure relates to an antenna control device, an antenna control method, and a program.

BACKGROUND ART

In related art, highly functional mobile communication terminals such as smartphones have been explosively spread, and there is an increasing need to mount such mobile communication terminals on mobile bodies and perform communication between the mobile bodies or between the mobile body and a base station. In order to satisfy such a need, for example, Patent Literature 1 describes a wireless communication device and a wireless communication system that effectively perform communication to a mobile body.

CITATION LIST

Patent Literature

Patent Literature 1: JP 2019-009744 A

SUMMARY OF INVENTION

Technical Problem

However, in the wireless communication device and the wireless communication system described in Patent Literature 1, there is a case where communication between antennas may become unstable due to movement characteristics of a mobile body and directivity of an antenna. For example, in a case where communication from a marine vessel on the sea to the land is considered, it is necessary to use a patch antenna with high directivity depending on a distance, and there is a case where beam widths of an E plane and an H plane are different depending on an antenna pattern thereof. The antenna pattern is illustration of radiation characteristics of the antenna as a functional space and represents directivity of the antenna. The beam width (3 dB beam width) refers to an angle between points at which radiation intensity (or reception sensitivity) of a radio wave radiated from the antenna decreases by 3 dB from a direction in which the radiation intensity becomes a maximum. The radio wave travels in the same phase on a plane where an electric field and a magnetic field are perpendicular to each other, and the E plane indicates an electric field surface and the H plane indicates a magnetic field surface. On the other hand, depending on a situation on the sea, there are a case where a wave is gentle, vertical shake generated in the ship is small, and it is necessary to mainly respond to movement of the ship in a horizontal direction due to periodic current, and a case where the wave is high and it is necessary to respond to vertical shake.

Solution to Problem

An object of the present disclosure made in view of such circumstances is to implement stable communication by optimizing an installation orientation of a directional antenna in accordance with antenna characteristics of the directional antenna and a change in an environment in which the directional antenna is to be used.

In order to solve the above problem, an antenna control device according to the present disclosure is an antenna control device that controls an orientation of a directional antenna, the antenna control device including: a mobile environment characteristic measurement unit that measures a displacement amount in a three-dimensional direction of a first communication device on which a first antenna is mounted; a storage unit that stores antenna characteristics of the first antenna; a determination unit that determines whether or not a gain of the first antenna is equal to or greater than a threshold when the first communication device communicates with a second communication device, and in a case where the gain of the first antenna is less than the threshold, receives as input the antenna characteristics of the first antenna and the displacement amount in the three-dimensional direction of the first communication device to determine orientations of the first antenna and a second antenna that is mounted on the second communication device so that the gain of the first antenna is equal to or greater than the threshold, and a first antenna orientation change unit that receives a determination result from the determination unit and changes the orientation of the first antenna.

In order to solve the above problem, an antenna control method according to the present disclosure is an antenna control method for controlling an orientation of a directional antenna, the antenna control method including: by an antenna control device, a storage step of storing antenna characteristics of a first antenna; a measurement step of measuring a displacement amount in a three-dimensional direction of a first communication device on which the first antenna is mounted; a determination step of determining whether or not a gain of the first antenna is equal to or greater than a threshold when the first communication device communicates with a second communication device; a determination step of, in a case where the gain of the first antenna is less than the threshold, receiving as input the antenna characteristics of the first antenna and the displacement amount in the three-dimensional direction of the first communication device to determine orientations of the first antenna and a second antenna that is mounted on the second communication device so that the gain of the first antenna is equal to or greater than the threshold; and a step of changing the orientation of the first antenna on the basis of determination in the determination step.

Furthermore, in order to solve the above problem, a program according to the present disclosure causes a computer to function as the antenna control device described above.

Advantageous Effects of Invention

According to the antenna control device of the present disclosure, it is possible to implement stable communication by optimizing an orientation of an antenna in accordance with movement of a first communication device.

DESCRIPTION OF EMBODIMENTS

Hereinafter, an embodiment of the present invention (hereinafter, simply referred to as "the present embodiment") will be described in detail. The present invention is not limited to the embodiment described below, and various modifications can be made within the scope of the gist of the present invention.

Figure 1:
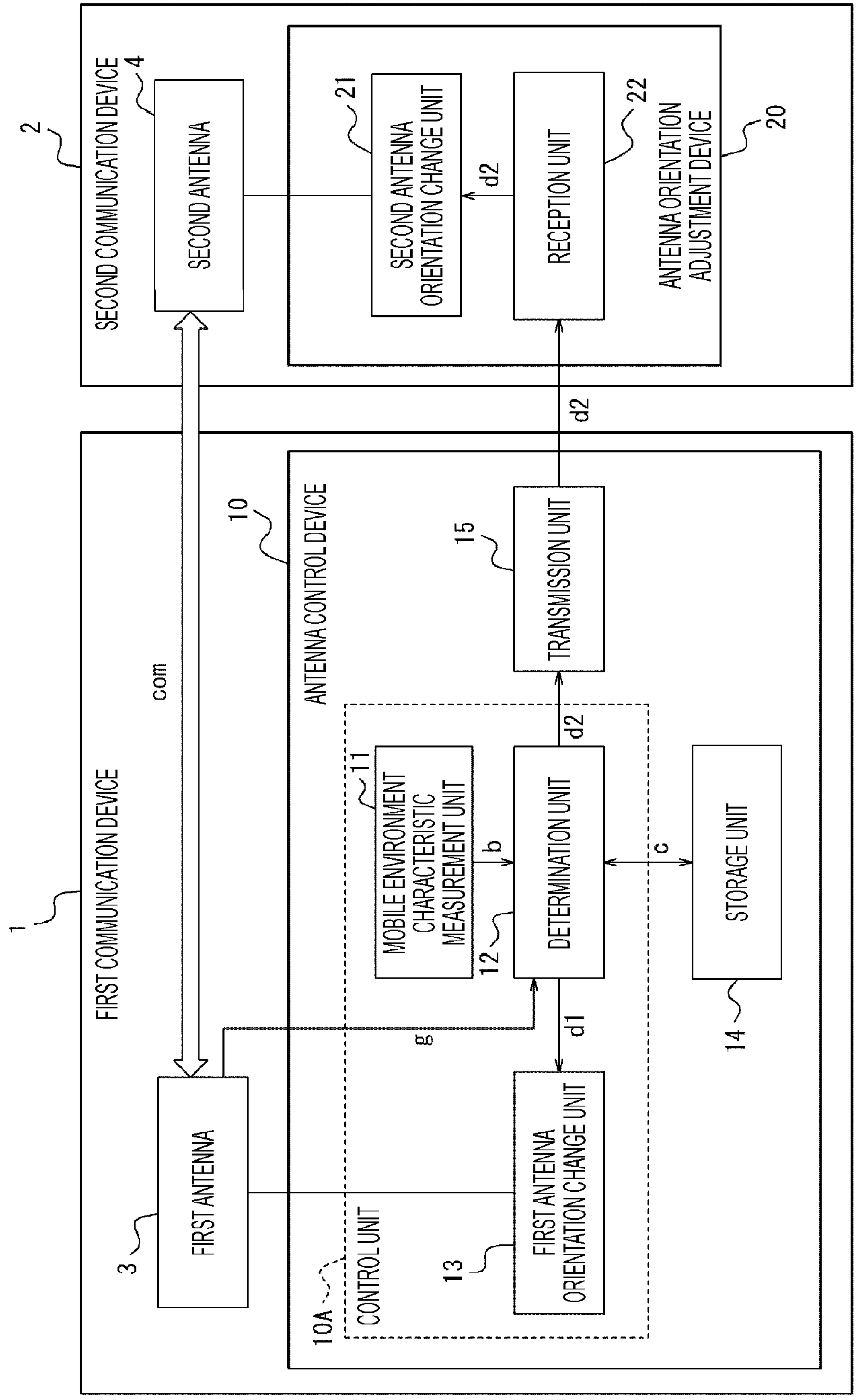
FIG. 1 is a block diagram illustrating a configuration example of an antenna control device according to an embodiment.

FIG. 1 is a block diagram illustrating a configuration example of an antenna control device according to an embodiment. As illustrated in FIG. 1, a first communication device 1 includes an antenna control device 10 and a first antenna 3.

The first communication device 1 is a mobile body such as a ship, but is not limited thereto. Furthermore, hereinafter, the first communication device 1 is also referred to as a mobile body 1.

The first antenna 3 is an antenna (directional antenna) having directivity to be mounted on the mobile body 1. When the mobile body 1 performs communication com with a second communication device 2 (hereinafter, the second communication device 2 will be also referred to as a ground station 2) which is a ground station provided on the ground, the first antenna 3 transmits and receives radio waves to and from a second antenna 4 having directivity fixed to the ground station 2. The first antenna 3, which is a directional antenna, is an antenna whose gain is equal to or greater than a threshold a when installed in a first direction, and whose gain is less than the threshold a when installed in a second direction having an arbitrary angle (for example, 90°) with the first direction.

The antenna control device 10 includes a mobile environment characteristic measurement unit 11, a determination unit 12, a first antenna orientation change unit 13, a storage unit 14, and a transmission unit 15. The antenna control device 10 controls orientations of the first antenna 3 and the second antenna 4 that are directional antennas. The mobile environment characteristic measurement unit 11, the determination unit 12, and the first antenna orientation change unit 13 constitute a control unit 10A (controller 10A). The control unit 10A (controller 10A) may be constituted with dedicated hardware such as an application specific integrated circuit (ASIC) or a field-programmable gate array (FPGA), may be constituted with a processor, or may be constituted with the both.

Figure 2:
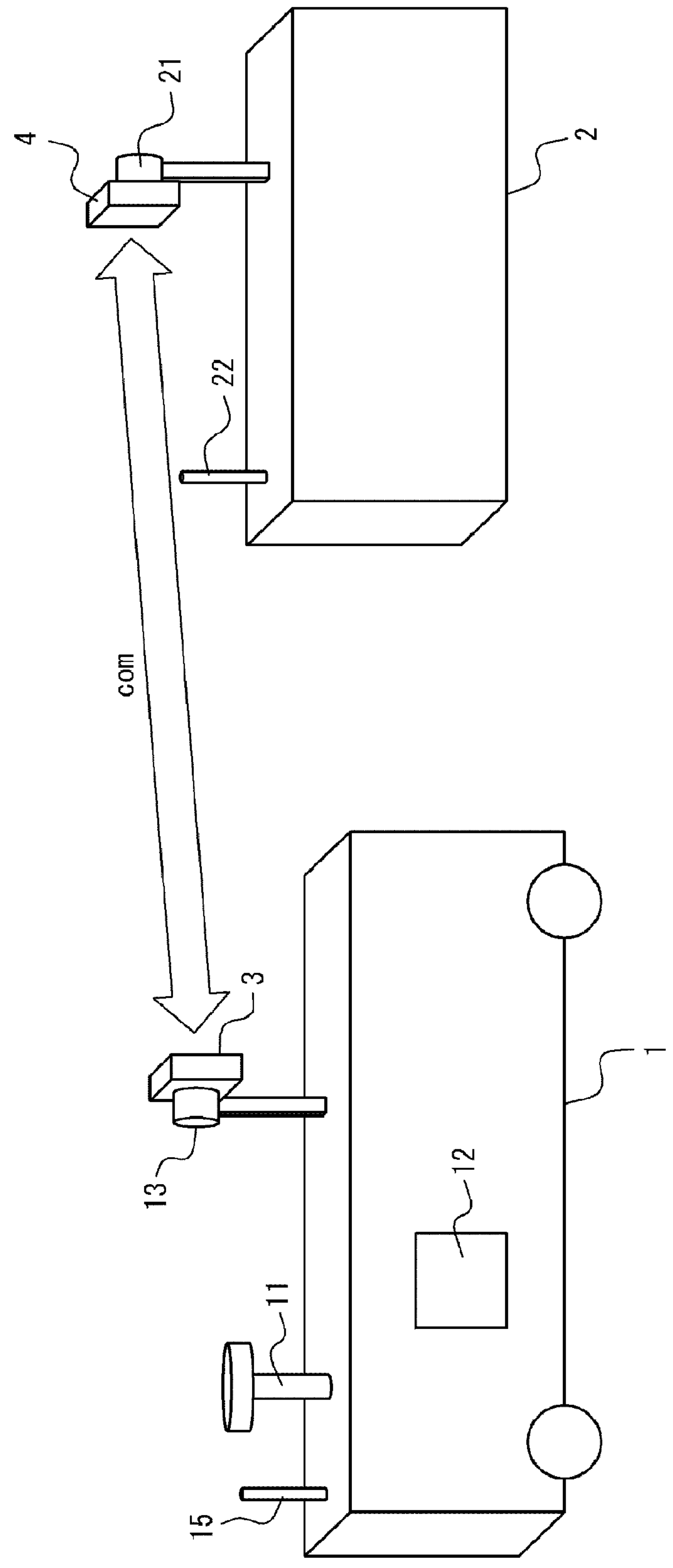
FIG. 2 is a schematic view of the antenna control device according to an embodiment.

FIG. 2 is a schematic view of an antenna control device according to an embodiment.

The first antenna 3 is a transmission/reception device that is mounted on the mobile body 1 and transmits and receives radio waves to and from the second antenna 4 fixed to the ground station 2.

The mobile environment characteristic measurement unit 11 is mounted on the mobile body 1 and measures a displacement amount b in a three-dimensional direction of the first communication device 1 (mobile body 1) on which the first antenna 3 is mounted using a known method. Examples of the known method include, but are not limited to, measurement of displacement based on position coordinates by a global navigation satellite system (GNSS), measurement of acceleration by an acceleration sensor, and the like.

The determination unit 12 is mounted on the mobile body 1 and has a function of measuring a gain g of the antenna of the first antenna 3. The determination unit 12 having such a function determines whether or not the gain g of the antenna of the first antenna 3 when the first communication device 1 performs communication com with the second communication device 2 is equal to or greater than a threshold a. In a case where it is determined that the gain g of the antenna of the first antenna 3 is less than the threshold a, antenna characteristics c of the first antenna 3 and the displacement amount b in the three-dimensional direction of the first communication device 1 (mobile body 1) are input, and an orientation of the first antenna 3 and an orientation of the second antenna 4 mounted on the second communication device 2 (ground station 2) are determined so that the gain of the antenna of the first antenna 3 becomes equal to or greater than the threshold a. On the other hand, in a case where it is determined that the gain g of the antenna of the first antenna 3 is equal to or greater than the threshold a, the orientation of the first antenna 3 and the orientation of the second antenna 4 are maintained without being changed.

The antenna characteristics c in the present disclosure refer to an antenna pattern. The antennas each have a unique directivity, and radio waves emitted from the antennas become weaker in a direction away from the center of radiation. In this event, an angle between points at which radiation intensity (or reception sensitivity) of a radio wave radiated from the antenna decreases by 3 dB from a direction in which the radiation intensity becomes a maximum is referred to as a beam width (3 dB beam width).

Figure 3:
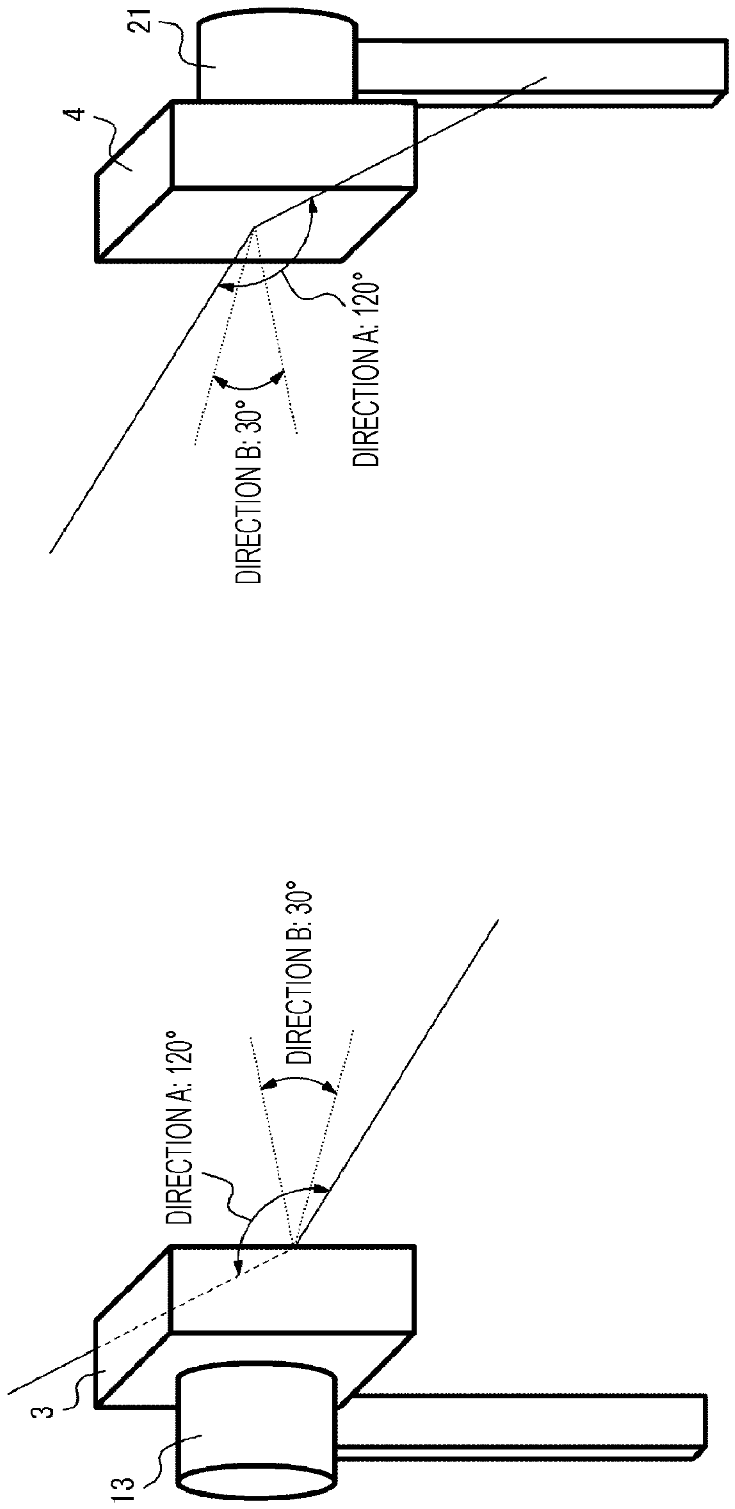
FIG. 3 is a view illustrating an orientation of an antenna corresponding to a state in which displacement of a first communication device 1 in a horizontal direction is large.

FIG. 3 is a view illustrating an orientation of the antenna corresponding to a state in which displacement of the first communication device 1 in a horizontal direction is large. The horizontal direction refers to a direction horizontal to the ground or the sea surface. In FIG. 3, the horizontal direction is defined as a direction A, and a direction having an arbitrary rotation angle from the direction A is defined as a direction B. It is assumed that the first antenna 3 is an antenna having a beam width of 120° in the direction A and 30° in the direction B as illustrated in FIG. 3. Generally, if the beam width is narrow (that is, the beam becomes sharp), if transmission power is the same, a radio wave reaches farther (the gain of the antenna becomes high). Thus, in such a case, it can be said that the first antenna 3 is an antenna having a large gain in the direction B and high directivity in the direction B. The antenna characteristics c are stored in advance in the storage unit 14 so that the determination unit 12 can read out the antenna characteristics c from the storage unit 14. In addition, it is assumed that the determination unit 12 receives as input the displacement amount b in the three-dimensional direction (vertical direction and horizontal direction) of the mobile body 1 measured by the mobile environment characteristic measurement unit 11. On the basis of the antenna characteristics c and the displacement amount b of the mobile body 1 in the three-dimensional direction, the determination unit 12 determines an orientation of the antenna so as to assign the direction A having the beam width of 120° to a direction in which the displacement amount is large and the direction B having the beam width of 30° with higher directivity to a direction in which the displacement amount is small among the displacement amounts b of the mobile body 1 in the three-dimensional direction. By determining the orientation of the antenna in this manner, stable communication can be implemented in the direction B with higher directivity.

Figure 4:
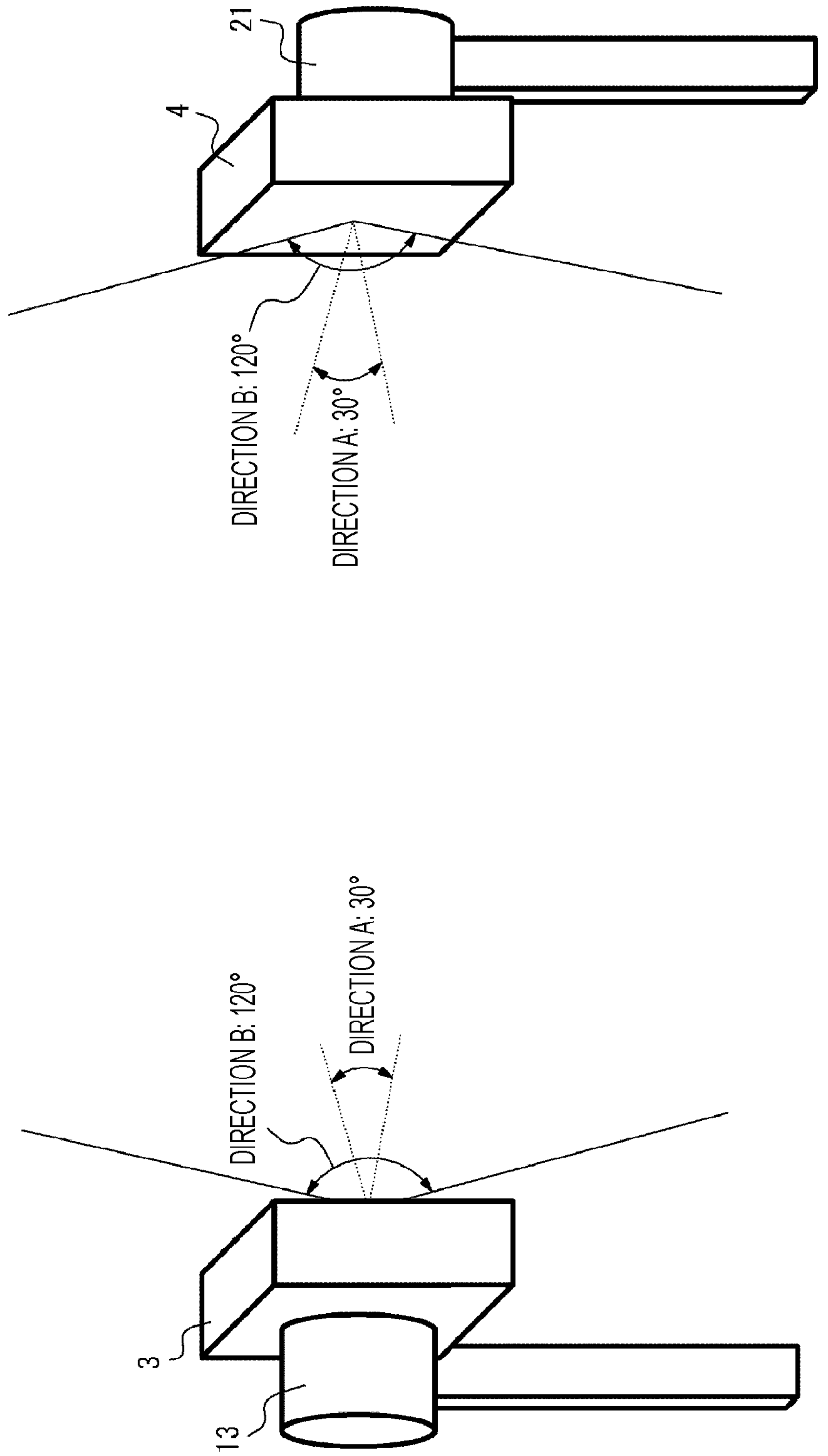
FIG. 4 is a view illustrating an orientation of an antenna corresponding to a state in which displacement of the first communication device 1 in a vertical direction is large.

FIG. 4 is a view illustrating an orientation of the antenna corresponding to a state in which displacement of the first communication device 1 in a vertical direction is large. The vertical direction refers to a direction perpendicular to the ground or the sea surface. In FIG. 4, the perpendicular direction is defined as the direction B, and a direction having an arbitrary rotation angle from the direction B is defined as the direction A. It is assumed that the first antenna 3 is an antenna having a beam width of 30° in the direction A and 120° in the direction B as illustrated in FIG. 4. In this case, the determination unit 12 determines an orientation of the antenna so as to assign the direction B having the beam width of 120° to a direction in which the displacement amount is large and the direction A having the beam width of 30° with higher directivity to a direction in which the displacement amount is small among the displacement amounts in the three-dimensional direction of the mobile body 1. By determining the orientation of the antenna in this manner, stable communication can be implemented in the direction A with higher directivity.

By performing the above processing, the determination unit 12 determines orientations of the first antenna 3 mounted on the mobile body 1 and the second antenna 4 fixed to the ground station 2. The determination unit 12 outputs a determination result d1 of the orientation of the antenna of the first antenna 3 to the first antenna orientation change unit 13. The determination unit 12 outputs a determination result d2 of the orientation of the antenna of the second antenna 4 to the transmission unit 15.

The first antenna orientation change unit 13 is mounted on the mobile body 1, receives the determination result d1 of the orientation of the antenna of the first antenna 3 from the determination unit 12 and changes the orientation of the first antenna 3. As illustrated in FIGS. 3 and 4, the first antenna orientation change unit 13 is a drive device that changes the orientation of the first antenna 3. The drive device is implemented by a stepping motor, a brushless motor, or the like, for causing rotation, an encoder for measuring a rotation angle, or the like, but is not limited thereto, and any device may be used as long as the orientation of the first antenna 3 can be changed to an arbitrary angle.

The storage unit 14 (memory 14) is mounted on the mobile body 1 and stores the antenna characteristics c of the first antenna 3 mounted on the mobile body 1. The storage unit 14 (memory 14) outputs the antenna characteristics c to the determination unit 12.

The transmission unit 15 is mounted on the mobile body 1 and transmits the determination result d2 of the orientation of the antenna of the second antenna 4 determined by the determination unit 12 to a reception unit 22 mounted on the ground station 2. As a transmission method in this event, for example, LTE, or the like, can be considered, but the transmission method is not limited thereto.

The description returns to FIG. 1 again. As illustrated in FIG. 1, the second communication device 2 includes an antenna orientation adjustment device 20 and the second antenna 4.

The second communication device 2 is a ground station provided on the ground and is also referred to as the ground station 2.

The second antenna 4 is a transmission and reception device that is fixed to the ground station 2 and transmits and receives radio waves to and from the first antenna 3 mounted on the mobile body 1. The second antenna 4 is an antenna having directivity and transmits and receives radio waves to and from the first antenna 3 having directivity mounted on the mobile body 1 when communication com is performed between the mobile body 1 and the ground station 2. The second antenna 4, which is a directional antenna, is an antenna whose gain is equal to or greater than a threshold a when installed in a first direction, and whose gain is less than the threshold a when installed in a second direction having an arbitrary angle with the first direction.

The reception unit 22 is mounted on the ground station 2 and receives the determination result d2 of the orientation of the antenna of the second antenna 4 determined by the determination unit 12 from the transmission unit 15 mounted on the mobile body 1. As a transmission/reception method in this event, for example, LTE, or the like, can be considered, but the transmission/reception method is not limited thereto. The reception unit 22 outputs the determination result d2 of the orientation of the antenna of the second antenna 4 determined by the determination unit 12 to a second antenna orientation change unit 21.

The second antenna orientation change unit 21 is mounted on the ground station 2, receives the determination result of the orientation of the antenna of the second antenna 4 determined by the determination unit 12 from the reception unit 22 and changes the orientation of the second antenna 4 to the angle determined by the determination unit 12. As illustrated in FIGS. 3 and 4, the second antenna orientation change unit 21 is a drive device that changes the orientation of the second antenna 4 to an arbitrary angle. The drive device is implemented by a stepping motor, a brushless motor, or the like, for causing rotation, an encoder for measuring a rotation angle, or the like, but is not limited thereto, and may be any device as long as the orientation of the second antenna 4 can be changed by any angle.

Figure 5:
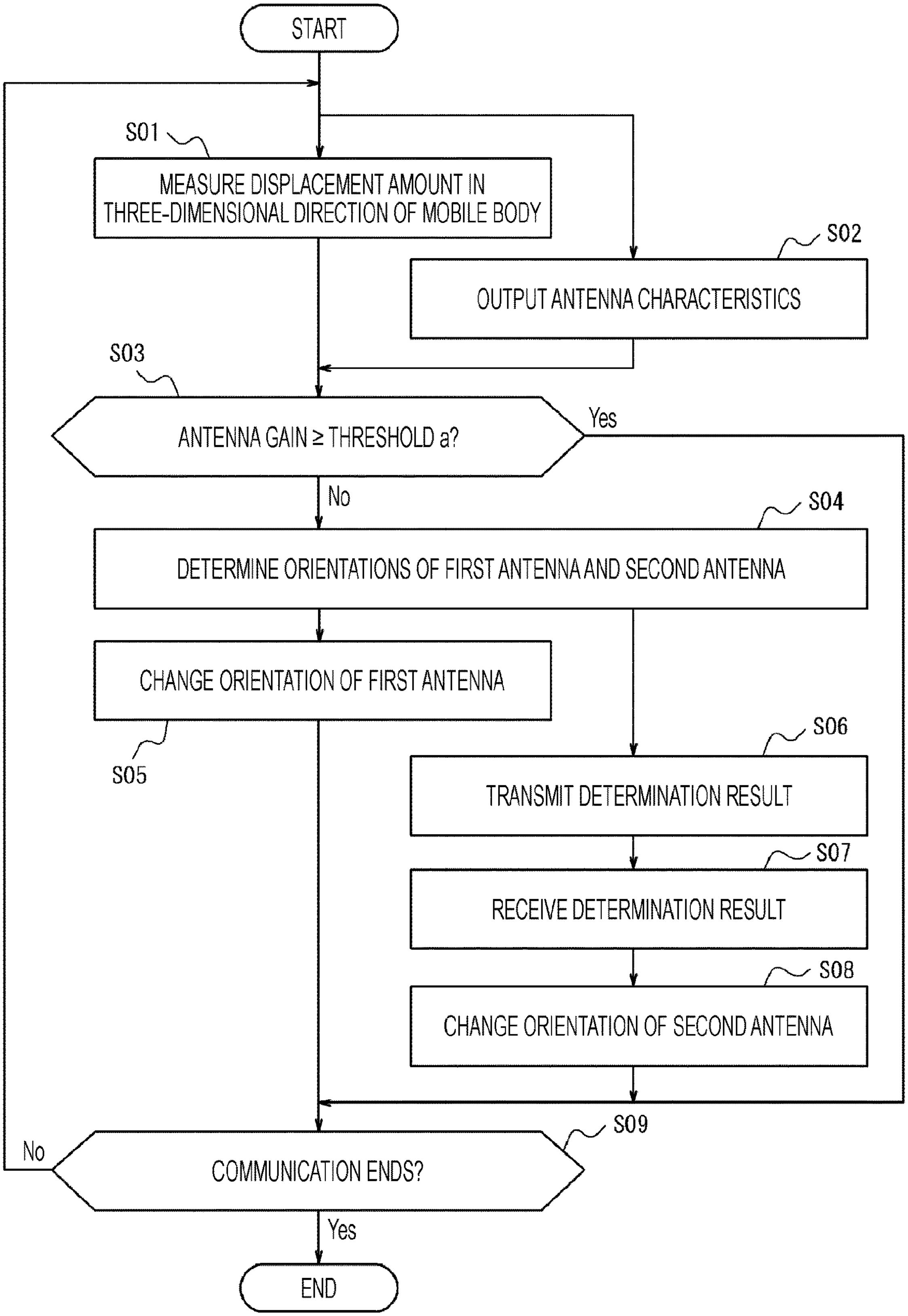
FIG. 5 is a flowchart illustrating an example of an antenna control method to be executed by the antenna control device according to an embodiment.

FIG. 5 is a flowchart illustrating an example of an antenna control method to be executed by the antenna control device according to an embodiment.

In step S01, the mobile environment characteristic measurement unit 11 of the mobile body 1 measures the displacement amount b of the mobile body 1 in the three-dimensional direction and outputs the displacement amount b to the determination unit 12.

In step S02, the storage unit 14 of the mobile body 1 outputs the stored antenna characteristics c of the first antenna 3 to the determination unit 12.

In step S03, the determination unit 12 of the mobile body 1 determines whether or not the gain g of the antenna is equal to or greater than the threshold a when the first antenna 3 performs communication com with the second antenna 4.

In step S04, in a case where it is determined that the gain g of the antenna is less than the threshold a, the determination unit 12 of the mobile body 1 receives the antenna characteristics c of the first antenna 3 and the displacement amount b of the mobile body 1 in the three-dimensional direction and determines the orientation of the first antenna 3 and the orientation of the second antenna 4.

In step S05, the first antenna orientation change unit 13 of the mobile body 1 receives the determination result d1 of the orientation of the antenna of the first antenna 3 from the determination unit 12 and changes the orientation of the first antenna 3.

In step S06, the transmission unit 15 of the mobile body 1 transmits the determination result d2 of the orientation of the antenna of the second antenna 4 to the reception unit 22 of the ground station 2.

In step S07, the reception unit 22 of the ground station 2 receives the determination result d2 of the orientation of the antenna of the second antenna 4.

In step S08, the second antenna orientation change unit 21 of the ground station 2 receives the determination result d2 of the orientation of the antenna of the second antenna 4 from the reception unit 22 and changes the orientation of the second antenna 4.

In step S09, in a case where the communication com between the mobile body 1 and the ground station 2 is being continued, the processing returns to step S01 to continue control of the orientation of the antenna, and in a case where the communication ends, control of the orientation of the antenna is terminated.

As described above, the antenna control device 10 changes the orientation of the first antenna 3 mounted on the mobile body 1 and the orientation of the second antenna 4 fixed to the ground station 2 in a direction in which influence of displacement due to movement of the mobile body 1 decreases.

According to the antenna control device 10 of the present disclosure, stable communication can be implemented by setting optimum antenna orientation according to the movement of the mobile body 1.

Figure 6:
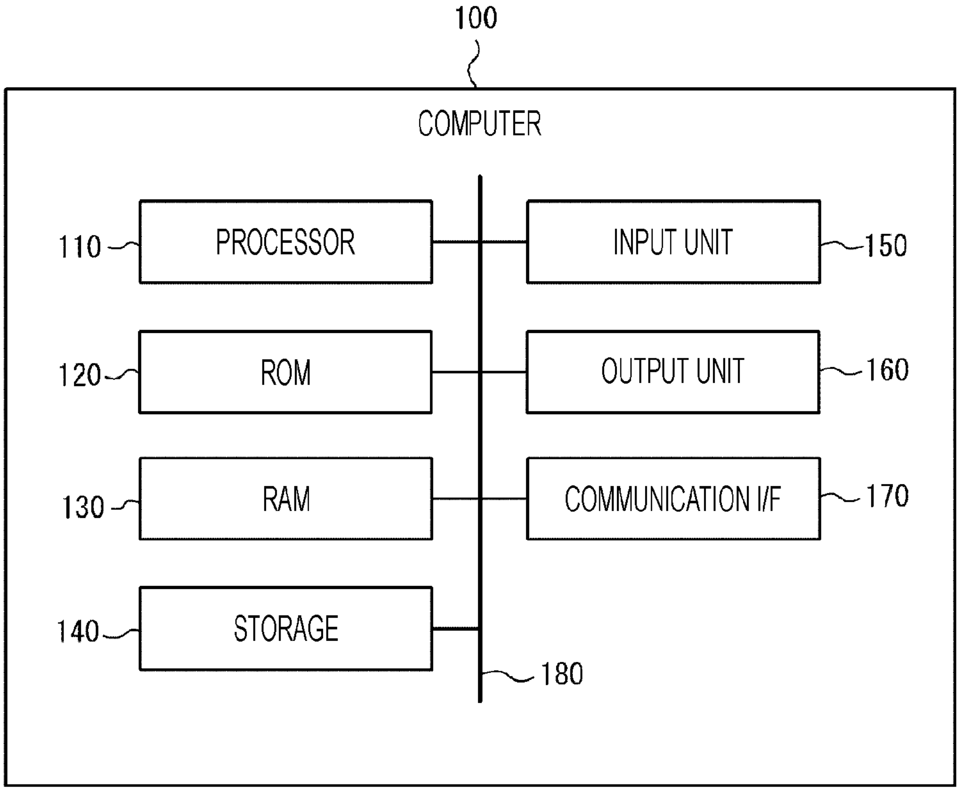
FIG. 6 is a block diagram illustrating a schematic configuration of a computer functioning as the antenna control device.

In order to cause the antenna control device 10 to function, a computer capable of executing a program instruction may be used. FIG. 6 is a block diagram illustrating a schematic configuration of a computer that functions as the antenna control device 10. Here, the computer functioning as the antenna control device 10 may be a general-purpose computer, a dedicated computer, a workstation, a personal computer (PC), an electronic notebook pad, or the like. The program instruction may be a program code, a code segment, or the like, for executing a necessary task.

As illustrated in FIG. 6, a computer 100 includes a processor 110, a read only memory (ROM) 120, a random access memory (RAM) 130, and a storage 140 as storage units, an input unit 150, an output unit 160, and a communication interface (I/F) 170. The respective components are communicably connected to one another via a bus 180.

The ROM 120 stores various kinds of programs and various kinds of data. The RAM 130 temporarily stores a program or data as a working area. The storage 140 is constituted by a hard disk drive (HDD) or a solid state drive (SSD) and stores various kinds of programs including an operating system and various kinds of data. In the present disclosure, a program according to the present disclosure is stored in the ROM 120 or the storage 140.

Specifically, the processor 110 is a central processing unit (CPU), a micro processing unit (MPU), a graphics processing unit (GPU), a digital signal processor (DSP), a system on a chip (SoC), or the like, and may be constituted by the same or different types of plurality of processors. The processor 110 reads a program from the ROM 120 or the storage 140 and executes the program by using the RAM 130 as a working area to perform control of each of the above-described components and various kinds of arithmetic processing. Note that at least part of these processing content may be implemented by hardware.

The program may be recorded in a recording medium readable by the antenna control device 10. Use of such a recording medium enables the program to be installed in the antenna control device 10. Here, the recording medium on which the program is recorded may be a non-transitory recording medium. Examples of the non-transitory recording medium include, but are not limited to, a CD-ROM, a DVD-ROM, and a universal serial bus (USB) memory. The program may be downloaded from an external device via a network.

Regarding the above embodiment, the following supplementary notes are further disclosed.

Supplementary Note 1

An antenna control device that controls an orientation of a directional antenna, the antenna control device including:

- a controller that measures a displacement amount in a three-dimensional direction of a first communication device on which a first antenna is mounted, determines whether or not a gain of the first antenna is equal to or greater than a threshold when the first communication device communicates with a second communication device, in a case where the gain of the first antenna is less than the threshold, receives as input antenna characteristics of the first antenna and the displacement amount in the three-dimensional direction of the first communication device to determine orientations of the first antenna and a second antenna that is mounted on the second communication device so that the gain of the first antenna is equal to or greater than the threshold, receives the determination result, and changes the orientation of the first antenna; and
- a memory that stores the antenna characteristics of the first antenna.

Supplementary Note 2

The antenna control device according to supplementary note 1,

- wherein the first communication device is a mobile body, and
- the second communication device is a ground station provided on the ground.

Supplementary Note 3

The antenna control device according to supplementary note 1 or 2,

- wherein when the first antenna and the second antenna are installed in a first direction, the gain is equal to or greater than the threshold, and when the first antenna and the second antenna are installed in a second direction having an arbitrary angle with the first direction, the gain is less than the threshold.

Supplementary Note 4

An antenna control method for controlling an orientation of a directional antenna, the antenna control method including:

- by an antenna control device,
- a storage step of storing antenna characteristics of a first antenna;
- a measurement step of measuring a displacement amount in a three-dimensional direction of a first communication device on which the first antenna is mounted;

a determination step of determining whether or not a gain of the first antenna is equal to or greater than a threshold when the first communication device communicates with a second communication device;

a determination step of, in a case where the gain of the first antenna is less than the threshold, receiving as input the antenna characteristics of the first antenna and the displacement amount in the three-dimensional direction of the first communication device to determine orientations of the first antenna and a second antenna that is mounted on the second communication device so that the gain of the first antenna is equal to or greater than the threshold; and a step of changing the orientation of the first antenna on the basis of determination in the determination step.

Supplementary Note 5

A non-transitory storage medium storing a program that can be executed by a computer, the non-transitory storage medium storing a program for causing the computer to function as the antenna control device according to any one of supplementary notes 1 to 3.

Although the above-described embodiment has been described as a representative example, it is apparent to those skilled in the art that many modifications and substitutions can be made within the spirit and scope of the present disclosure. Thus, it should not be understood that the present invention is limited by the above-described embodiments, and various modifications or changes can be made without departing from the scope of the claims. For example, a plurality of configuration blocks described in the configuration diagram of the embodiment can be combined into one, or one configuration block can be divided.

| Reference Signs List | |
|---|---|
| 1 | First communication device (mobile body) |
| 2 | Second communication device (ground station) |
| 10 | Antenna control device |
| 10A | Control unit (controller) |
| 11 | Mobile environment characteristic measurement unit |
| 12 | Determination unit |
| 13 | First antenna orientation change unit |
| 14 | Storage unit (memory) |
| 15 | Transmission unit |
| 20 | Antenna orientation adjustment device |
| 21 | Second antenna orientation change unit |
| 22 | Reception unit |
| 100 | Computer |
| 110 | Processor |
| 120 | ROM |
| 130 | RAM |
| 140 | Storage |
| 150 | Input unit |
| 160 | Output unit |
| 170 | Communication interface (I/F) |
| 180 | Bus |

The invention claimed is:

1. An antenna control device that controls an orientation of a directional antenna, the antenna control device comprising:

a mobile environment characteristic measurement unit that measures a displacement amount in a three-dimensional direction of a first communication device on which a first antenna is mounted;

a storage unit that stores antenna characteristics of the first antenna;

a determination unit that determines whether or not a gain of the first antenna is equal to or greater than a threshold when the first communication device communicates with a second communication device, and in a case where the gain of the first antenna is less than the threshold, receives as input the antenna characteristics of the first antenna and the displacement amount in the three-dimensional direction of the first communication device to determine orientations of the first antenna and a second antenna that is mounted on the second communication device so that the gain of the first antenna is equal to or greater than the threshold; and a first antenna orientation change unit that receives a determination result from the determination unit and changes the orientation of the first antenna.

2. The antenna control device according to claim 1, wherein the first communication device is a mobile body, and the second communication device is a ground station provided on a ground.

3. The antenna control device according to claim 1, wherein when the first antenna and the second antenna are installed in a first direction, the gain is equal to or greater than the threshold, and when the first antenna and the second antenna are installed in a second direction having an arbitrary angle with the first direction, the gain is less than the threshold.

4. The antenna control device according to claim 1, further comprising a moving body that receives determination result of antenna direction of the first antenna, wherein the moving body comprises a first antenna direction changing unit that changes the direction of the first antenna to an arbitrary angle.

5. The antenna control device according to claim 1, wherein the second antenna further comprising a second antenna direction changer that changes direction of the second antenna to an arbitrary angle.

6. The antenna control device according to claim 1, wherein communication is stabilized by optimizing orientation of the first antenna according to movement of the first communication device.

7. An antenna control method for controlling an orientation of a directional antenna, the antenna control method comprising:

by an antenna control device, storing antenna characteristics of a first antenna;

measuring a displacement amount in a three-dimensional direction of a first communication device on which the first antenna is mounted;

determining whether or not a gain of the first antenna is equal to or greater than a threshold when the first communication device communicates with a second communication device;

in a case where the gain of the first antenna is less than the threshold, receiving as input the antenna characteristics of the first antenna and the displacement amount in the three-dimensional direction of the first communication device to determine orientations of the first antenna and a second antenna that is mounted on the second communication device so that the gain of the first antenna is equal to or greater than the threshold; and changing the orientation of the first antenna on a basis of determination in the determination step.

8. The antenna control method according to claim 7, wherein the first communication device is a mobile body, and the second communication device is a ground station provided on a ground.

9. The antenna control method according to claim 7, wherein when the first antenna and the second antenna are installed in a first direction, the gain is equal to or greater than the threshold, and when the first antenna and the second antenna are installed in a second direction having an arbitrary angle with the first direction, the gain is less than the threshold.

10. The antenna control method according to claim 7, the antenna control device changes the direction of the first antenna to an arbitrary angle based on determination result of antenna direction of the first antenna.

11. The antenna control method according to claim 7, the antenna control device changes direction of the second antenna to an arbitrary angle based on determination result of antenna direction of the second antenna.

12. A computer-readable non-transitory recording medium storing computer-executable program instructions that when executed by a processor cause a computer to execute a program generation method comprising:

storing antenna characteristics of a first antenna;

measuring a displacement amount in a three-dimensional direction of a first communication device on which the first antenna is mounted;

determining whether or not a gain of the first antenna is equal to or greater than a threshold when the first communication device communicates with a second communication device;

in a case where the gain of the first antenna is less than the threshold, receiving as input the antenna characteristics of the first antenna and the displacement amount in the three-dimensional direction of the first communication device to determine orientations of the first antenna and a second antenna that is mounted on the second communication device so that the gain of the first antenna is equal to or greater than the threshold; and changing the orientation of the first antenna on a basis of determination in the determination step.

13. The method according to claim 12, wherein the first communication device is a mobile body, and the second communication device is a ground station provided on a ground.

14. The method according to claim 12, wherein when the first antenna and the second antenna are installed in a first direction, the gain is equal to or greater than the threshold, and when the first antenna and the second antenna are installed in a second direction having an arbitrary angle with the first direction, the gain is less than the threshold.

15. The method according to claim 12, wherein direction of the first antenna to an arbitrary angle based on determination result of antenna direction of the first antenna.

16. The method according to claim 12, wherein direction of the second antenna to an arbitrary angle based on determination result of antenna direction of the second antenna.

* * * * *